United States Patent
Natanzon

(10) Patent No.: US 10,855,535 B1
(45) Date of Patent: Dec. 1, 2020

(54) METHOD AND SYSTEM FOR MANAGING VIRTUAL DATACENTERS

(71) Applicant: EMC Corporation, Hopkinton, MA (US)

(72) Inventor: Assaf Natanzon, Tel Aviv (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 535 days.

(21) Appl. No.: 14/984,312

(22) Filed: Dec. 30, 2015

(51) Int. Cl.
*H04L 12/24* (2006.01)
*H04L 12/26* (2006.01)
*H04L 29/08* (2006.01)

(52) U.S. Cl.
CPC .......... *H04L 41/0816* (2013.01); *H04L 43/04* (2013.01); *H04L 67/10* (2013.01)

(58) Field of Classification Search
CPC ..... H04L 41/0816; H04L 43/04; H04L 67/10; H04L 67/1034; H04L 67/1095; G05B 13/04; G06F 11/079; G06F 11/1458; G06F 11/3433; G06F 11/3442; G06F 11/3447; G06F 2009/4557; G06F 2009/45591; G06F 2201/815; G06F 2201/84; G06F 9/45558
See application file for complete search history.

(56) References Cited

U.S. PATENT DOCUMENTS

| | | | |
|---|---|---|---|
| 7,680,997 B1* | 3/2010 | Specht | G06F 11/26 711/162 |
| 8,738,972 B1* | 5/2014 | Bakman | G06F 11/0712 714/47.1 |
| 2014/0122926 A1* | 5/2014 | Bartholomy | G06F 11/14 714/15 |
| 2016/0147549 A1* | 5/2016 | Sivak | G06F 9/45558 718/1 |
| 2016/0274978 A1* | 9/2016 | Strohmenger | G05B 13/04 |
| 2016/0366218 A1* | 12/2016 | Cors | H04L 67/1095 |
| 2017/0034001 A1* | 2/2017 | Dagan | H04L 41/12 |

* cited by examiner

*Primary Examiner* — Christopher Biagini
(74) *Attorney, Agent, or Firm* — Workman Nydegger

(57) ABSTRACT

Example embodiments of the present invention relate to methods, systems, and a computer program product for managing a virtual datacenter. The method includes tracking configuration metadata for a virtual datacenter operating at a first site and simulating the virtual datacenter at a second site according to the tracked virtual datacenter configuration metadata. An analysis then may be performed on operation of the simulated virtual datacenter at the second site.

21 Claims, 8 Drawing Sheets

METHOD AND SYSTEM FOR MANAGING VIRTUAL DATACENTERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to datacenter management.

BACKGROUND

A virtual datacenter typically comprises an information technology (IT) infrastructure that extends virtualization concepts such as abstraction, pooling, and automation to a data center's resources and services. In a virtual datacenter, elements of the infrastructure, including networking, storage, CPU, and security, may be virtualized and delivered as a service.

SUMMARY

Example embodiments of the present invention relate to methods, systems, and a computer program product for managing a virtual datacenter. The method includes tracking configuration metadata for a virtual datacenter operating at a first site and simulating the virtual datacenter at a second site according to the tracked virtual datacenter configuration metadata. An analysis then may be performed on operation of the simulated virtual datacenter at the second site.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
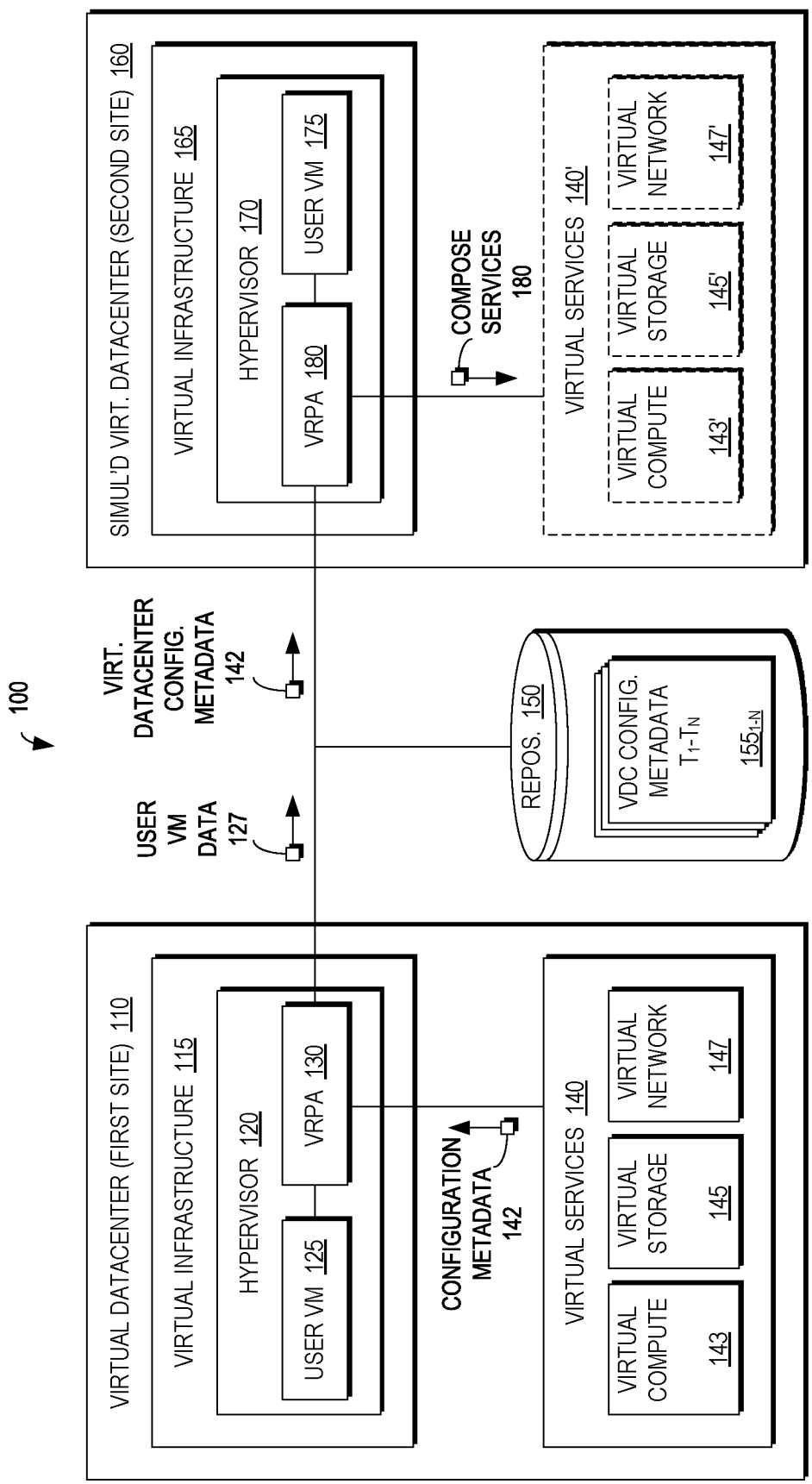
FIG. 1 is a block diagram of a system including a virtual datacenter at a first site and a simulation of the virtual datacenter at a second site according to an example embodiment of the present invention.

FIG. 1 is a block diagram of a system 100 including a virtual datacenter (VDC) 110 at a first site and a simulation of the virtual datacenter 160 at a second site according to an example embodiment of the present invention. The virtual datacenter 110 includes a virtual infrastructure 115 from which a plurality of virtual services 140 may be composed, such as virtual compute 143, virtual storage 145, and virtual network 147. Operating in the virtual infrastructure 115 may be a hypervisor 120 managing a user virtual machine (VM) 125 and a virtual Recover Point Appliance (vRPA) 130.

The first site may also be referred to as a source side (e.g., virtual or physical) or a transmitter of data within, for example, a data replication workflow. During normal operation, a production site is the source side and during data recovery a backup site is the source side. A production site may be a facility (e.g., virtual or physical) where one or more host computers run data processing applications that write data to a storage system and read data from the storage system. The second site may also be referred to as a target side (e.g., virtual or physical) or a receiver of data within, for example, a data replication workflow. During normal operation a backup site is the target side and during data recovery a production site is the target side. A backup/replica site may be a facility (e.g., virtual or physical) where replicated production site data is stored and may be located in a remote site or at the same location as the production site. The production site and the backup site may be remote from one another, or they may both be situated at a common site, local to one another. Local data protection has the advantage of minimizing data lag between target and source, and remote data protection has the advantage is being robust in the event that a disaster occurs at the source side.

The vRPA 130 may be a Recover Point Appliance (RPA) running in a VM. The RPA (also referred to as a Data Protection Appliance (DPA)) may be a computer or a cluster of computers, or a set of processes that serve as a DPA, responsible for data protection services. The DPA/RPA may be a physical device, a virtual device, or may be a combination of a virtual and a physical device. In certain embodiments, the vRPA 130 is an EMC RecoverPoint® replication appliance by EMC Corporation of Hopkinton, Mass.

A discussion of virtual replication and a virtual splitter may be may be found in U.S. patent application Ser. No. 13/599,492 entitled "MULTI SITE AND MULTI TENANCY" filed on Aug. 30, 2012 and Ser. No. 14/227,058 entitled "VIRTUAL SPLITTER" filed on Mar. 27, 2014, respectively, both of which are assigned to EMC Corporation of Hopkinton, Mass. and incorporated herein by reference.

Data protection services provided by the vRPA 130 may include, inter alia, data replication of a storage system, journaling of I/O requests issued by a host computer to the storage system, and, as described in greater detail below, simulation of a virtual datacenter 110 at a first site to a simulated virtual datacenter 160 at a second site. A host may be at least one computer or virtual machine or networks of computers that runs at least one data processing application that issues I/O requests to one or more storage systems (e.g., an initiator in a storage area network (SAN)). A journal may be a record of write transactions issued to a storage system and may be used to maintain a duplicate storage system and to roll back the duplicate storage system to a previous point in time.

A discussion of journaling and journal based replication may be found in U.S. patent application Ser. No. 13/077,256 entitled "CONSISTENT REPLICATION IN A GEOGRAPHICALLY DISPERSE ACTIVE ENVIRONMENT" and Ser. No. 13/077,262 entitled "INVERSE STAR REPLICATION", both filed on Mar. 31, 2011, and U.S. Pat. No. 7,516,287 entitled "METHOD AND APPARATUS FOR OPTIMAL JOURNALING FOR CONTINUOUS DATA REPLICATION" and U.S. Pat. No. 9,063,994 entitled "NETWORKED BASED REPLICATION OF DISTRIBUTED VOLUMES", all of which are assigned to EMC Corporation of Hopkinton, Mass. and incorporated herein by reference.

As illustrated in FIG. 1, configuration metadata 142 for the virtual services 140 may be retrieved from the virtual services 140. The configuration metadata 142 together with any other configuration metadata for the virtual datacenter, such as user VM 125 metadata, may be tracked at various times $T_1$-$T_N$ and stored in a repository 150 as a plurality of virtual datacenter configuration metadata records $155_{1-N}$. In some embodiments, the user virtual machine data 127 also may be stored in the repository 150 to, for example, replicate the full state of the virtual datacenter 110 at the first site. In certain embodiments, the repository 150 may be a journal.

The simulation of the virtual datacenter 160 at the second site may include a virtual infrastructure 165 from which a plurality of virtual services 140' may be composed, such as virtual compute 143', virtual storage 145', and virtual network 147', form the virtual datacenter configuration metadata 142 of the virtual datacenter 110 at the first site, as will be described in greater detail below. Similar to the virtual datacenter 110 at the first site, operating in the virtual infrastructure 165 may be a hypervisor 170 managing a user virtual machine (VM) 175 and a virtual Recover Point Appliance (vRPA) 180.

Figure 2:
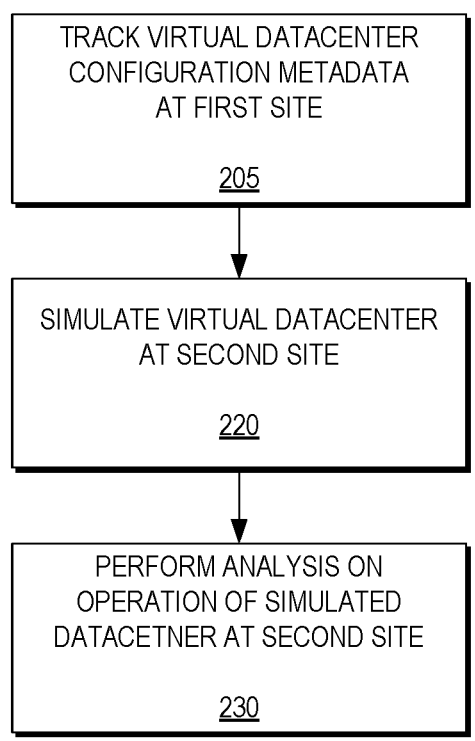
FIG. 2 is a flow diagram illustrating a method for managing virtual datacenters according to an example embodiment of the present invention.

As illustrated in FIG. 1, the vRPA 130 may continuously or periodically track the configuration metadata 142. At a first time T1, the tracked virtual datacenter configuration metadata 142 is stored in the repository $155_1$. At a next time T2, the tracked virtual datacenter configuration metadata 142 is stored in the repository $155_2$. At a next time $T_N$, the tracked virtual datacenter configuration metadata 142 is stored in the repository $155_N$. This process may include a continuous monitoring and tracking of the virtual datacenter configuration metadata. The configuration metadata stored in the repository 150 at different times $155_{1-N}$ may be sent to the simulated virtual datacenter 160 at the second site in certain embodiments. As will be described in greater detail below, configuration metadata 142 sent to the simulated virtual datacenter 160 at the second site may be used to perform simulations and analyze how changes in the virtual datacenter 110 configuration may impact the virtual datacenter 110 at the first site. The analysis may include recommending corrective measure to the virtual datacenter 110 at the first site and/or discarding or rolling back changes made to configuration of the virtual datacenter 110 at the first site. The simulated virtual datacenter 160 at the second site enables the vRPA 180 at the second site to give a very accurate simulation of the workload on the virtual datacenter 110 at the first site to, as described in greater detail below, determine the root cause of problems or sub-optimal configurations or to predict problems, FIG. 2 is a flow diagram illustrating a method for managing virtual datacenters according to an example embodiment of the present invention. FIG. 2 may be described in conjunction with FIG. 1. As illustrated in FIGS. 1 and 2, according to an example embodiment of the present invention, a vRPA 130 may track configuration metadata 142 for the virtual datacenter 110 at a first site (205). The vRPA 130 at the first site may replica the virtual datacenter configuration metadata 142 from the virtual datacenter 110 at the first site to a vRPA 180 at a simulated virtual datacenter 160 at a second site to simulate at the second site the virtual datacenter 110 at the first site as a simulated virtual datacenter 160 according to the tracked virtual datacenter configuration metadata 142 (220). The vRPA 180 at the simulated virtual datacenter 160 at the second site then may perform an analysis on operation of the simulated virtual datacenter 160 at the second site (230). In some embodiments, the virtual datacenter configuration metadata 142 (or the user virtual machine data 127) may be replicated directly from the virtual datacenter 110 at the first site to the simulated virtual datacenter 160 at the second site. In other embodiments, the virtual datacenter configuration metadata 142 (or the user virtual machine data 127) may be stored to the repository 150 at a first time and retrieved from the repository and transmitted to the simulated virtual datacenter 160 at the second site at a second time.

Figure 3:
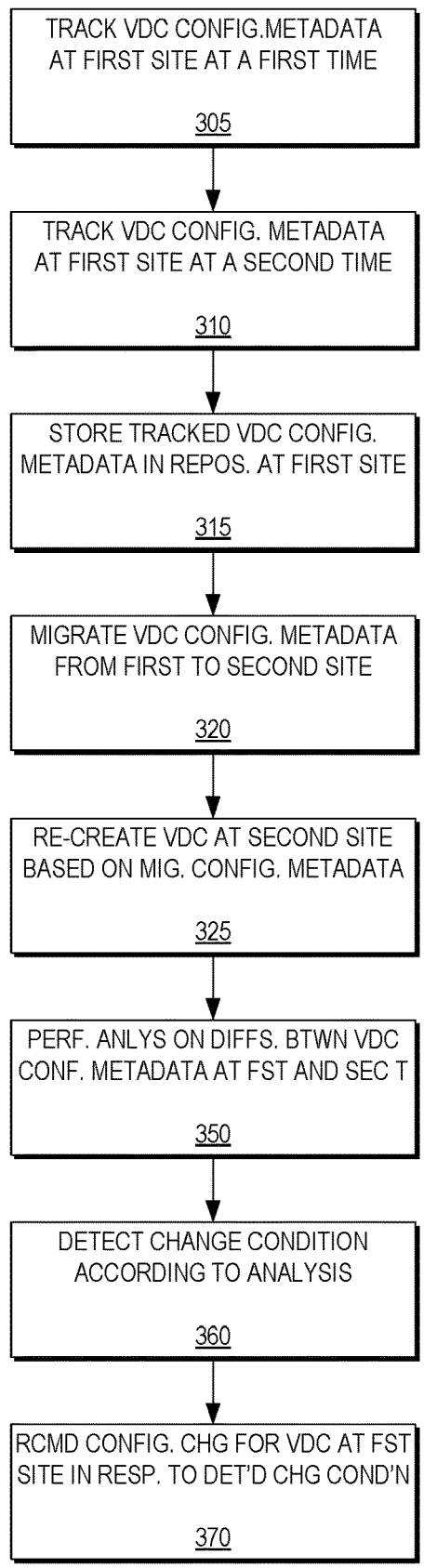
FIG. 3 is a flow diagram illustrating a method for recommending a configuration change for the virtual datacenter at the first site in response to a detected change condition according to an example embodiment of the present invention.

FIG. 3 is a flow diagram illustrating a method for recommending a configuration change for the virtual datacenter at the first site 110 in response to a detected change condition according to an example embodiment of the present invention. FIG. 3 may be described in conjunction with FIG. 1. As illustrated in FIGS. 1 and 3, the vRPA 130 at the first site may track virtual datacenter 110 configuration metadata 142 at a first time (305). The vRPA 130 also may track virtual datacenter 110 configuration metadata 142 at a second time (310). The virtual datacenter 110 configuration metadata 142 tracked at the first time and at the second time may be stored in a repository 150 (315).

The vRPA 130 then may migrate the virtual datacenter 110 configuration metadata 142 from the first site to the second site (320). According to an example embodiment, the vRPA 130 at the first site may perform replication of the virtual datacenter 110 configuration metadata 142 to the vRPA 180 at the second site. In some embodiments, the vRPA 130 at the first site may replicate the virtual datacenter 110 configuration metadata 142 to the vRPA 180 at the second site as the virtual datacenter 110 configuration metadata 142 is gathered at the first site. In other embodiments, the vRPA 130 at the first site may retrieve the virtual datacenter 110 configuration metadata 142 from the repository 150 and replicate it to the vRPA 180 at the second site. The vRPA 180 at the second site then may re-create at the second site the virtual datacenter 110 at the first site as a simulated virtual datacenter 160 according to, or based on, the migrated virtual datacenter 110 configuration metadata 142 (325).

Leveraging the simulated virtual datacenter 160, the vRPA 180 at the second site the may perform an analysis of differences between the virtual datacenter 110 configuration metadata 142 at the first time and at the second time (as stored in step 315) (350), for example simulating the second site according to the configuration metadata received. The vRPA 180a t the second site may detect a change condition in the virtual datacenter 110 configuration metadata 142 according to its analysis (360) and, accordingly, recommend a configuration change for the virtual datacenter 110 at the first site in response to the change condition detected at the simulated virtual datacenter 160 at the second site (370). It should be understood that the vRPA 130, 180 may define (i.e., run) the their respective virtual datacenters 110, 160 according to different virtual datacenter applications and may monitor the virtual datacenters via management applications such as VMware® vSphrere®, VMware vCloud@, and other software defined network (SDN) application programming interfaces (APIs).

Therefore, example embodiments of the present invention ensure that testing may be performed on the simulated virtual datacenter 160 at the second site without disturbing the virtual datacenter 110 at the first site (i.e., production environment). An advantage of creating the simulated virtual datacenter 160 is to simulate the virtual datacenter 110 according to the tracked virtual datacenter configuration metadata 142. A further advantage is that analysis may be performed on the on operation of the simulated virtual datacenter 160 based on the virtual datacenter 110 configuration metadata 142 but at the second site as opposed to performing analysis on the virtual datacenter 110, itself, at the first site. Accordingly, results of the analysis performed on the simulated virtual datacenter 160 at the second site using the tracked configuration metadata 142 from the virtual datacenter 110 at the first site may be implemented on the virtual datacenter 110 at the first site (or a third virtual datacenter). Example embodiments of the present invention may track configuration metadata 142 including hypervisor 120 configuration metadata, compute node configuration metadata of the virtual compute 143 services, storage volume configuration metadata of the virtual storage 145 services, software defined network configuration metadata of the virtual network 147 services, configuration metadata of the user virtual machine 125 and any other virtual machines managed by the hypervisor 120, and any other metadata regarding the configuration of the virtual datacenter 110 or its components.

Figure 4:
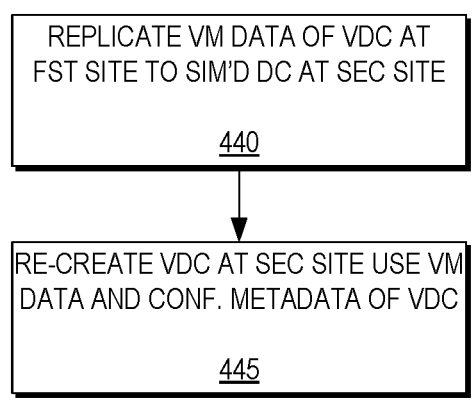
FIG. 4 is a flow diagram illustrating a method for re-creating at the second site the virtual datacenter at the first site according to virtual machine data and tracked virtual datacenter configuration metadata according to an example embodiment of the present invention.

FIG. 4 is a flow diagram illustrating a method for re-creating the virtual datacenter 110 at the first site as the simulated virtual datacenter 160 at the second site according to virtual machine data 127 and the tracked virtual datacenter configuration metadata 142 according to an example embodiment of the present invention. As described above with respect to FIG. 3, example embodiments of the present invention may track the virtual datacenter 110 configuration metadata 142 at a first time (305) and at a second time (310), and migrate the virtual datacenter 110 configuration metadata 142 from the first site to the second site (320). In addition, example embodiments of the present invention may also replicate virtual machine data 127 for the user virtual machine 125 at the first site to the simulated virtual datacenter 160 at the second site (440). Thus, with the virtual datacenter 110 configuration metadata 142 replicated to the simulated virtual datacenter 160 for composition of the services 180 as virtual services 140' at the simulated virtual datacenter 160, the user virtual machine data 127 replicated to the simulated virtual datacenter 160 may be used to re-create the virtual datacenter 110 at the second site as the simulated virtual datacenter 160.

Figure 5:
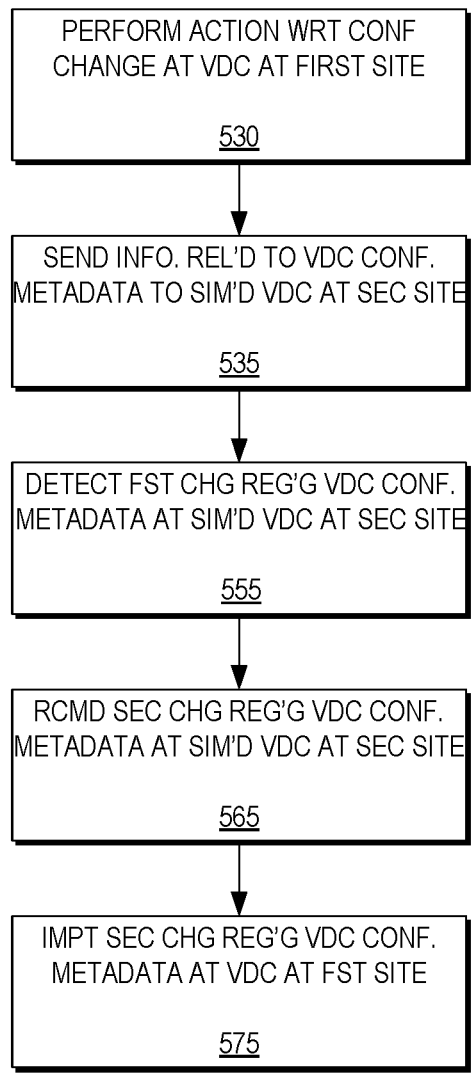
FIG. 5 is a flow diagram illustrating a method for implementing a change regarding virtual datacenter configuration metadata at the first site according to an example embodiment of the present invention.

FIG. 5 is a flow diagram illustrating a method for implementing a change regarding virtual datacenter configuration metadata at the first site according to an example embodiment of the present invention. As illustrated in FIG. 5, the system 100 may perform an action with regard to a configuration change at the virtual datacenter 110 at the first site (530). Information related to the virtual datacenter 110 configuration metadata then may be sent to the simulated virtual datacenter 160 at the second site (535). According to the information, the vRPA 180 at the second site may detect a first change regarding the virtual datacenter 110 configuration metadata at the simulated virtual datacenter 160 at the second site (555) and recommend a second change regarding the virtual datacenter 110 configuration metadata at the simulated virtual datacenter 160 at the second site (565). The second change regarding the virtual datacenter 110 configuration metadata at then may be implemented at the virtual datacenter 110 at the first site (575).

In some embodiments, the action with regard to the configuration change may include making a configuration change at the virtual datacenter 110 at the first site. In such embodiments, the information related to the virtual datacenter 110 configuration metadata may include tracked configuration metadata of the virtual datacenter 110 at the first site. Thus, the first change regarding the virtual datacenter 110 may be an actual change in the configuration of the virtual datacenter 110 which may be simulated at the simulated virtual datacenter 160 according to the tracked configuration metadata replicated from the virtual datacenter 110 to the simulated virtual datacenter 160. As described above, an analysis may be performed with regard to the simulated virtual datacenter 160 and a second change may be recommended to alter the configuration of the simulated virtual datacenter 160 which then may be implemented at the virtual datacenter 110 at the first site.

In other embodiments, performing an action with regard to a configuration change at the virtual datacenter 110 at the first site may include intercepting the configuration change at the virtual datacenter 110 at the first site before the configuration change is executed on the virtual datacenter 110 at the first site. Alternatively, a proposed change may be submitted to the simulated virtual datacenter 160a t the second site before performing the change at the virtual datacenter 110 at the first site to determine an effect on the virtual datacenter 110 at the first site according to the simulation. As described above, the tracked configuration metadata 142 may be replicated from the virtual datacenter 110 to the simulated virtual datacenter 160 and an analysis performed so that a second change may be recommended to alter the configuration of the simulated virtual datacenter 160 which then may be implemented at the virtual datacenter 110 at the first site.

Figure 6C:
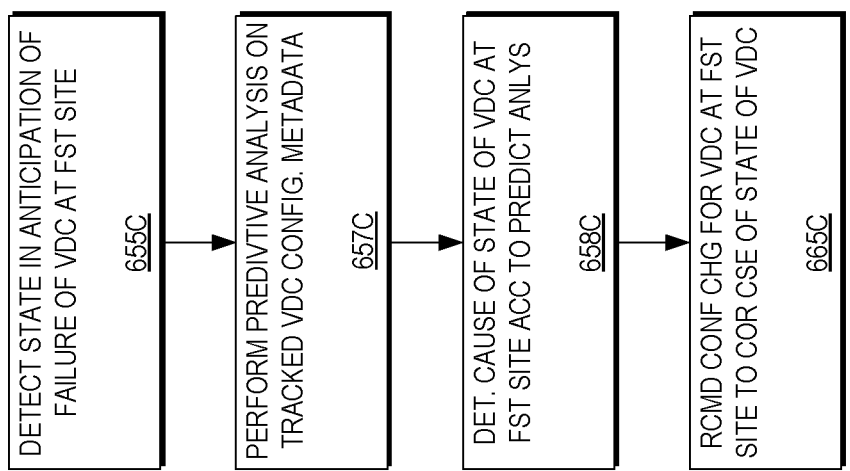
FIGS. 6A-6C are flow diagram illustrating methods for recommending a configuration change for the virtual datacenter at the first site to correct the cause of a change condition of the virtual datacenter at the first site according to respective example embodiments of the present invention.
Figure 6B:
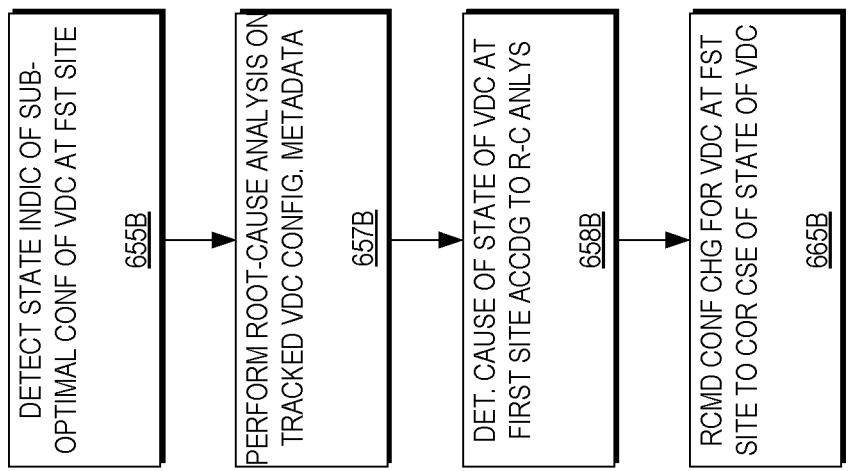
Figure 6A:
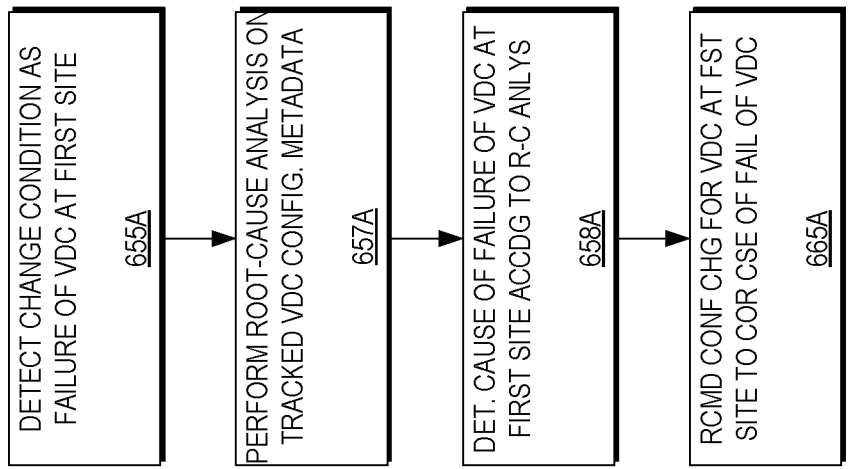

FIGS. 6A-6C are flow diagram illustrating methods for recommending a configuration change for the virtual datacenter at the first site to correct the cause of a change condition of the virtual datacenter at the first site according to respective example embodiments of the present invention. As will be described in greater detail below, example embodiments of the present invention relate to performing root-cause and predictive analysis to determine the cause of failures, sub-optimal configurations, and states in anticipation of a failure of the virtual datacenter 110 at the first site.

FIG. 6A is a flow diagram illustrating a method for determining, and recommending a configuration change to correct, a cause of a failure of the virtual datacenter 110 at the first site according to a root-cause analysis. As illustrated in FIG. 6A, in performing an analysis on the differences between the virtual datacenter 110 configuration metadata 142 at a first time and at a second time (e.g., 230 of FIG. 2), example embodiments of the present invention may detect a change condition (e.g., first change 555 of FIG. 5) as a failure of the virtual datacenter 110 at the first site (655A). The vRPA 180 at the second site then may perform a root-cause analysis on the tracked virtual datacenter 110 configuration metadata 142(657A) and determine a cause of the failure of the virtual datacenter 110 at the first site (658A). The vRPA 180 then may recommend a configuration change for the virtual datacenter 110 at the first site to correct the cause of the failure of the virtual datacenter 110 (665A).

FIG. 6B is a flow diagram illustrating a method for determining, and recommending a configuration change to correct, a cause of a sub-optimal configuration state of the virtual datacenter 110 at the first site according to a root-cause analysis. As illustrated in FIG. 6B, in performing an analysis on the differences between the virtual datacenter 110 configuration metadata 142 at a first time and at a second time (e.g., 230 of FIG. 2), example embodiments of the present invention may detect a state indicative of a sub-optimal configuration of the virtual datacenter 110 at the first site (655B). The vRPA 180 at the second site then may perform a root-cause analysis on the tracked virtual datacenter 110 configuration metadata 142 (657B) and determine a cause of the state indicative of a sub-optimal configuration of the virtual datacenter 110 (658B). The vRPA 180 then may recommend a configuration change for the virtual datacenter 110 at the first site to correct the cause of the state indicative of a sub-optimal configuration of the virtual datacenter 110 (665B).

The root cause analysis of FIGS. 6A and 6B may be performed by simulating the changes that occurred in the virtual datacenter 110 at the first site to determine the change that made or otherwise contributed to the failure or state indicative of a sub-optimal configuration. It should be understood that the vRPA 180 may attempt multiple configurations at the simulated virtual datacenter 160 at the second site to determine which configuration is safe and which configuration may have caused the failure or state indicative of a sub-optimal configuration.

FIG. 6C is a flow diagram illustrating a method for determining, and recommending a configuration change to correct, a cause of a state in anticipation of a failure of the virtual datacenter 110 at the first site according to a predictive analysis. As illustrated in FIG. 6C, in performing an analysis on the differences between the virtual datacenter 110 configuration metadata 142 at a first time and at a second time (e.g., 230 of FIG. 2), example embodiments of the present invention may detect a state in anticipation of a failure of the virtual datacenter 110 at the first site (655C). The vRPA 180 at the second site then may perform a predictive analysis on the tracked virtual datacenter 110 configuration metadata 142 (657C) and determine a cause of the state in anticipation of a failure of the virtual datacenter 110 (658C). The vRPA 180 then may recommend a configuration change for the virtual datacenter 110 at the first site to correct the cause of the state in anticipation of a failure of the virtual datacenter 110 (665C).

Figure 7:
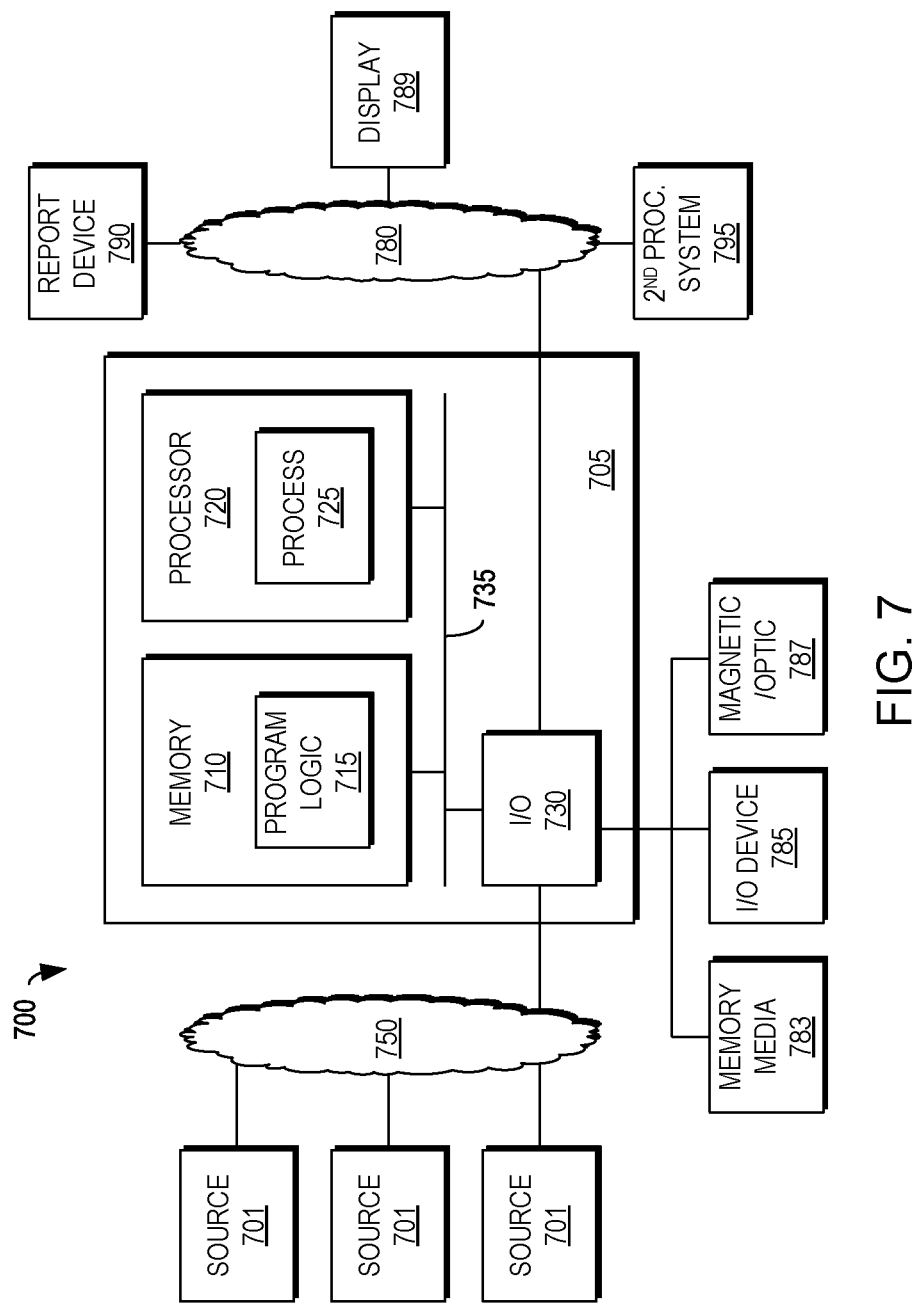
FIG. 7 is a block diagram illustrating an apparatus according to an example embodiment of the present invention.

FIG. 7 is a block diagram of an example embodiment apparatus 705 according to the present invention. The apparatus 705 may be part of a system 700 and includes memory 710 storing program logic 715, a processor 720 for executing a process 725, and a communications I/O interface 730, connected via a bus 735. The exemplary apparatus 705 is discussed only for illustrative purpose and should not be construed as a limitation on the embodiments or scope of the present invention. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be re-ordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 7, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

Figure 8:
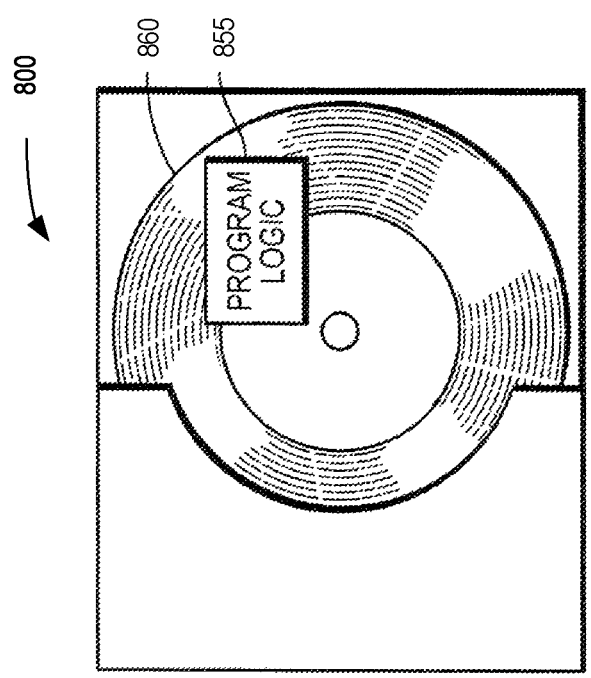
FIG. 8 is an illustration of an example embodiment of the present invention as embodied in computer program code.

FIG. 8 is a block diagram of a computer program product 800 including program logic 855, encoded on a computer-readable medium 860 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 855 may be loaded into memory and executed by processor. In a further embodiment, program logic 855 may also be the same program logic 855 on a computer readable medium.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

Herein, various exemplary embodiments of the present invention are described with reference to the accompanying drawings. It should be noted that all of these drawings and description are only presented as exemplary embodiments. It is to be noted that, based on the description, alternative embodiments may be conceived that may have a structure and method disclosed as herein, and such alternative embodiments may be used without departing from the principle of the invention as claimed.

It may be appreciated that these exemplary embodiments are provided only for enabling those skilled in the art to better understand and then further implement the present invention, not intended to limit the scope of the present invention in any manner. Besides, in the drawings, for a purpose of illustration, optional steps, modules, and units are illustrated in dotted-line blocks.

The terms "comprise(s)", "include(s)", their derivatives and like expressions used herein should be understood to be open (i.e., "comprising/including, but not limited to". The term "based on" means "at least in part based on", the term "one embodiment" means "at least one embodiment", and the term "another embodiment" indicates "at least one further embodiment". Relevant definitions of other terms may be provided throughout.

It may be noted that the flowcharts and block diagrams in the figures may illustrate the apparatus, method, as well as architecture, functions and operations executable by a computer program product according to various embodiments of the present invention. In this regard, each block in the flowcharts or block diagrams may represent a module, a program segment, or a part of code, which may contain one or more executable instructions for performing specified logic functions. It should be further noted that, in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

What is claimed is:

1. A computer-implemented method for managing virtual datacenters in a storage system environment comprising:
    tracking configuration metadata of a virtual datacenter operating at a first site in the storage system environment, wherein the configuration metadata includes hypervisor configuration metadata, compute node configuration metadata, storage volume metadata, configuration data of virtual machines managed by a hypervisor;
    simulating the virtual datacenter as a simulated virtual datacenter at a second site in the storage system environment by applying the tracked virtual datacenter configuration metadata to the simulated virtual datacenter;
    performing an analysis on operation of the simulated virtual datacenter at the second site based on the tracked configuration metadata to correct a cause of a change condition of the virtual datacenter operating at the first site, wherein the analysis includes an analysis of differences between the configuration metadata at a first time and the configuration metadata at a second time;
    recommending a configuration change to the configuration metadata of the virtual datacenter operating at the first site based on the operation of the simulated virtual datacenter at the second site according to the tracked virtual datacenter configuration metadata; and
    implementing the recommended change at the virtual datacenter operating at the first site.

2. The method of claim 1,
    wherein tracking configuration metadata for the virtual datacenter operating at a first site comprises:
    tracking the virtual datacenter configuration metadata at the first time and at the second time; and
    storing the tracked virtual datacenter configuration metadata in a repository;
    wherein simulating the virtual datacenter at a second site according to the tracked virtual datacenter configuration metadata comprises:
    migrating the tracked virtual datacenter configuration metadata from the first site to the second site; and
    re-creating the virtual datacenter at the second site based on the migrated configuration metadata; and
    wherein performing an analysis on operation of the simulated virtual datacenter at the second site comprises performing the analysis on differences between the virtual datacenter configuration metadata at the first time and the virtual datacenter configuration metadata at the second time.

3. The method of claim 2, wherein performing the analysis on differences between the virtual datacenter configuration metadata at the first time and the virtual datacenter configuration metadata at the second time comprises:

detecting the change condition according to the analysis of the virtual datacenter configuration metadata at the first time and the virtual datacenter configuration metadata at the second time; and recommending the configuration change for the virtual datacenter at the first site in response to the detected change condition.

4. The method of claim 3, wherein detecting the change condition comprises detecting a failure of the virtual datacenter at the first site; and wherein recommending the configuration change for the virtual datacenter at the first site in response to the detected failure of the virtual datacenter at the first site comprises:

performing a root-cause analysis on the tracked datacenter configuration metadata;

determining a cause of the failure of the virtual datacenter at the first site according to the root-cause analysis; and recommending the configuration change for the virtual datacenter at the first site to correct the cause of the failure of the virtual datacenter at the first site.

5. The method of claim 3, wherein detecting the change condition comprises detecting a state indicative of a sub-optimal configuration of the virtual datacenter at the first site; and wherein recommending the configuration change for the virtual datacenter at the first site in response to the detected state indicative of a sub-optimal configuration of the virtual datacenter at the first site comprises:

performing a root-cause analysis on the tracked datacenter configuration metadata;

determining a cause of the state indicative of a sub-optimal configuration of the virtual datacenter at the first site according to the root-cause analysis; and recommending the configuration change for the virtual datacenter at the first site to correct the cause of the state indicative of a sub-optimal configuration of the virtual datacenter at the first site.

6. The method of claim 3, wherein detecting the change condition comprises detecting a state in anticipation of a failure of the virtual datacenter at the first site; and wherein recommending the configuration change for the virtual datacenter at the first site in response to the detected state in anticipation of a failure of the virtual datacenter at the first site comprises:

performing a predictive analysis on the tracked datacenter configuration metadata;

determining a cause of the state in anticipation of a failure at the virtual datacenter at the first site according to the predictive analysis; and recommending the configuration change for the virtual datacenter at the first site to correct the cause of the state in anticipation of a failure of the virtual datacenter at the first site.

7. The method of claim 1, wherein tracking configuration metadata for a virtual datacenter operating at a first site comprises performing an action with respect to the configuration change at the virtual datacenter at the first site;

wherein simulating the virtual datacenter at a second site according to the tracked virtual datacenter configuration metadata comprises:

sending information related to virtual datacenter configuration metadata to the simulated virtual datacenter at the second site; and detecting a first change regarding virtual datacenter configuration metadata at the simulated virtual datacenter at the second site; and the method further comprising:

recommending a second change regarding the virtual datacenter configuration metadata at the simulated virtual datacenter at the second site; and implementing the second change regarding the virtual datacenter configuration metadata at the virtual datacenter at the first site.

8. The method of claim 7, wherein performing an action with respect to a configuration change at the virtual datacenter at the first site comprises making the configuration change at the virtual datacenter at the first site;

wherein sending information related to virtual datacenter configuration metadata to the simulated virtual datacenter at the second site comprises sending the tracked configuration metadata of the virtual datacenter from the first site to the second site;

wherein detecting a first change regarding virtual datacenter configuration metadata at the simulated virtual datacenter at the second site comprises detecting the first change in the configuration metadata for the virtual datacenter at the first site;

wherein recommending a second change regarding the virtual datacenter configuration metadata at the simulated virtual datacenter at the second site comprises recommending a correction to be implemented in the configuration of the virtual datacenter at the first site; and wherein implementing the second change regarding the virtual datacenter configuration metadata at the virtual datacenter at the first site comprises implementing at the virtual datacenter at the first site the correction recommended at the simulated virtual datacenter at the second site.

9. The method of claim 7, wherein performing an action with respect to the configuration change at the virtual datacenter at the first site comprises intercepting the configuration change at the virtual datacenter at the first site;

wherein sending information related to virtual datacenter configuration metadata to the simulated virtual datacenter at the second site comprises sending the intercepted configuration change to the simulated virtual datacenter at the second site;

wherein detecting a first change regarding virtual datacenter configuration metadata at the simulated virtual datacenter at the second site comprises detecting the first change in the configuration metadata for the virtual datacenter at the second site;

wherein recommending a second change regarding the virtual datacenter configuration metadata at the simulated virtual datacenter at the second site comprises recommending a modification to the configuration change to be implemented in the configuration of the virtual datacenter at the first site; and wherein implementing the second change regarding the virtual datacenter configuration metadata at the virtual datacenter at the first site comprises implementing at the virtual datacenter at the first site the modified configuration change recommended at the simulated virtual datacenter at the second site.

10. The method of claim 1, further comprising:
replicating virtual machine data of the virtual datacenter at the first site to the simulated virtual datacenter at the second site; and
re-creating the virtual datacenter at the second site according to the virtual machine data and the configuration metadata of the virtual datacenter at the first site, the simulated virtual datacenter at the second site being a replica of the virtual datacenter at the first site.

11. A storage system environment comprising:
a virtual datacenter at a first site, the first site being in the storage system environment;
a second site being in the storage system environment, the first and second site being connected via a network; and
memory storing computer program code that when executed on a processor causes the processor to execute a datacenter management process operable to perform the operations of:
tracking configuration metadata of the virtual datacenter operating at the first site, wherein the configuration metadata includes hypervisor configuration metadata, compute node configuration metadata, storage volume metadata, configuration data of virtual machines managed by a hypervisor;
simulating the virtual datacenter as a simulated virtual datacenter at the second site by applying the tracked virtual datacenter configuration metadata to the simulated virtual datacenter;
performing an analysis on operation of the simulated virtual datacenter at the second site based on the tracked configuration metadata to correct a cause of a change condition of the virtual datacenter operating at the first site, wherein the analysis includes an analysis of differences between the configuration metadata at a first time and the configuration metadata at a second time;
recommending a configuration change to the configuration metadata of the virtual datacenter operating at the first site based on the operation of the simulated virtual datacenter at the second site according to the tracked virtual datacenter configuration metadata; and
implementing the recommended change at the virtual datacenter operating at the first site.

12. The system of claim 11,
wherein computer program code operable to perform the operation of tracking configuration metadata for the virtual datacenter operating at a first site comprises computer program code operable to perform the operations of:
tracking the virtual datacenter configuration metadata at the first time and at the second time; and
storing the tracked configuration metadata of the virtual datacenter in a repository;
wherein computer program code operable to perform the operation of simulating the virtual datacenter at a second site according to the tracked virtual datacenter configuration metadata comprises computer program code operable to perform the operations of:
migrating the tracked configuration metadata of the virtual datacenter from the first site to the second site; and
re-creating the virtual datacenter at the second site based on the migrated configuration metadata; and
wherein computer program code operable to perform the operation of performing an analysis on operation of the simulated virtual datacenter at the second site comprises computer program code operable to perform the operation of performing the analysis on differences between the virtual datacenter configuration metadata at the first time and the virtual datacenter configuration metadata at the second time.

13. The system of claim 12, wherein computer program code operable to perform the operation of performing the analysis on differences between the virtual datacenter configuration metadata at the first time and the virtual datacenter configuration metadata at the second time comprises computer program code operable to perform the operations of:
detecting the change condition according to the analysis of the virtual datacenter configuration metadata at the first time and the virtual datacenter configuration metadata at the second time; and
recommending the configuration change for the virtual datacenter at the first site in response to the detected change condition.

14. The system of claim 13,
wherein computer program code operable to perform an operation of detecting the change condition comprises computer program code operable to perform the operation of detecting a failure of the virtual datacenter at the first site; and
wherein computer program code operable to perform the operation of recommending the configuration change for the virtual datacenter at the first site in response to the detected failure of the virtual datacenter at the first site comprises computer program code operable to perform the operations of:
performing a root-cause analysis on the tracked datacenter configuration metadata;
determining a cause of the failure of the virtual datacenter at the first site according to the root-cause analysis; and
recommending the configuration change for the virtual datacenter at the first site to correct the cause of the failure of the virtual datacenter at the first site.

15. The system of claim 13,
wherein computer program code operable to perform the operation of detecting the change condition comprises computer program code operable to perform an operation of detecting a state indicative of a sub-optimal configuration of the virtual datacenter at the first site; and
wherein computer program code operable to perform the operation of recommending the configuration change for the virtual datacenter at the first site in response to the detected state indicative of a sub-optimal configuration of the virtual datacenter at the first site, comprises computer program code operable to perform the operations of:
performing a root-cause analysis on the tracked datacenter configuration metadata;
determining a cause of the state indicative of a sub-optimal configuration of the virtual datacenter at the first site according to the root-cause analysis; and
recommending the configuration change for the virtual datacenter at the first site to correct the cause of the state indicative of a sub-optimal configuration of the virtual datacenter at the first site.

16. The system of claim 13,
wherein computer program code operable to perform the operation of detecting the change condition comprises computer program code operable to perform an operation of detecting a state in anticipation of a failure of the virtual datacenter at the first site; and
wherein computer program code operable to perform the operation of recommending the configuration change for the virtual datacenter at the first site in response to the detected state in anticipation of a failure of the virtual datacenter at the first site comprises computer program code operable to perform the operations of:

performing a predictive analysis on the tracked datacenter configuration metadata;

determining a cause of the state in anticipation of a failure at the virtual datacenter at the first site according to the predictive analysis; and recommending the configuration change for the virtual datacenter at the first site to correct the cause of the state in anticipation of a failure of the virtual datacenter at the first site.

17. The system of claim 11, wherein computer program code operable to perform the operation of tracking configuration metadata for a virtual datacenter operating at a first site comprises computer program code operable to perform an operation of performing an action with respect to a configuration change at the virtual datacenter at the first site;

wherein computer program code operable to perform the operation of simulating the virtual datacenter at a second site according to the tracked virtual datacenter configuration metadata comprises computer program code operable to perform the operations of:

sending information related to virtual datacenter configuration metadata to the simulated virtual datacenter at the second site; and detecting a first change regarding virtual datacenter configuration metadata at the simulated virtual datacenter at the second site; and wherein the memory further stores computer program code operable to perform the operations of:

recommending a second change regarding the virtual datacenter configuration metadata at the simulated virtual datacenter at the second site; and implementing the second change regarding the virtual datacenter configuration metadata at the virtual datacenter at the first site.

18. The system of claim 17, wherein computer program code operable to perform the operation of performing an action with respect to a configuration change at the virtual datacenter at the first site comprises computer program code operable to perform the operation of making the configuration change at the virtual datacenter at the first site;

wherein computer program code operable to perform the operation of sending information related to virtual datacenter configuration metadata to the simulated virtual datacenter at the second site comprises computer program code operable to perform the operation of sending the tracked configuration metadata of the virtual datacenter from the first site to the second site;

wherein computer program code operable to perform the operation of detecting a first change regarding virtual datacenter configuration metadata at the simulated virtual datacenter at the second site comprises computer program code operable to perform the operation of detecting the first change in the configuration metadata for the virtual datacenter at the first site;

wherein computer program code operable to perform the operation of recommending a second change regarding the virtual datacenter configuration metadata at the simulated virtual datacenter at the second site comprises computer program code operable to perform the operation of recommending a correction to be implemented in the configuration of the virtual datacenter at the first site; and wherein computer program code operable to perform the operation of implementing the second change regarding the virtual datacenter configuration metadata at the virtual datacenter at the first site comprises computer program code operable to perform the operation of implementing at the virtual datacenter at the first site the correction recommended at the simulated virtual datacenter at the second site.

19. The system of claim 17, wherein computer program code operable to perform the operation of performing an action with respect to a configuration change at the virtual datacenter at the first site comprises computer program code operable to perform the operation of intercepting the configuration change at the virtual datacenter at the first site;

wherein computer program code operable to perform the operation of sending information related to virtual datacenter configuration metadata to the simulated virtual datacenter at the second site comprises computer program code operable to perform the operation of sending the intercepted configuration change to the simulated virtual datacenter at the second site;

wherein computer program code operable to perform the operation of detecting a first change regarding virtual datacenter configuration metadata at the simulated virtual datacenter at the second site comprises computer program code operable to perform the operation of detecting the first change in the configuration metadata for the virtual datacenter at the second site;

wherein computer program code operable to perform the operation of recommending a second change regarding the virtual datacenter configuration metadata at the simulated virtual datacenter at the second site comprises computer program code operable to perform the operation of recommending a modification to the configuration change to be implemented in the configuration of the virtual datacenter at the first site; and wherein computer program code operable to perform the operation of implementing the second change regarding the virtual datacenter configuration metadata at the virtual datacenter at the first site comprises computer program code operable to perform the operation of implementing at the virtual datacenter at the first site the modified configuration change recommended at the simulated virtual datacenter at the second site.

20. The system of claim 11, wherein the memory further stores computer program code operable to perform the operations of:

replicating virtual machine data of the virtual datacenter at the first site to the simulated virtual datacenter at the second site; and re-creating the virtual datacenter at the second site according to the virtual machine data and the configuration metadata of the virtual datacenter at the first site, the simulated virtual datacenter at the second site being a replica of the virtual datacenter at the first site.

21. A computer program product including a non-transitory computer readable storage medium having computer program code encoded thereon that when executed on a processor of a computer causes the computer to manage virtual datacenters in a storage system environment comprising:

computer program code for:

tracking configuration metadata of a virtual datacenter operating at a first site in the storage system environment, wherein the configuration metadata includes hypervisor configuration metadata, compute node configuration metadata, storage volume metadata, configuration data of virtual machines managed by a hypervisor;

simulating the virtual datacenter as a simulated virtual datacenter at a second site in the storage system environment by applying the tracked virtual datacenter configuration metadata to the simulated virtual datacenter; and performing an analysis on operation of the simulated virtual datacenter at the second site based on the tracked configuration metadata to correct a cause of a change condition of the virtual datacenter operating at the first site, wherein the analysis includes an analysis of differences between the configuration metadata at a first time and the configuration metadata at a second time;

recommending a configuration change to the configuration metadata of the virtual datacenter operating at the first site based on the operation of the simulated virtual datacenter at the second site according to the tracked virtual datacenter configuration metadata; and implementing the recommended change at the virtual datacenter operating at the first site.

* * * * *